United States Patent [19]

Ortiz

[11] Patent Number: 5,231,641
[45] Date of Patent: Jul. 27, 1993

[54] CRYSTALLINE SLAB LASER WITH INTRACAVITY NON-LINEAR OPTIC

[75] Inventor: Mark V. Ortiz, San Jose, Calif.

[73] Assignee: Laserscope, San Jose, Calif.

[21] Appl. No.: 823,711

[22] Filed: Jan. 21, 1992

[51] Int. Cl.$^5$ .................................................. G11C 29/00
[52] U.S. Cl. ......................................... 372/21; 372/93
[58] Field of Search ...................... 372/21, 22, 93, 98, 372/99, 105

[56] References Cited

U.S. PATENT DOCUMENTS

| | | | |
|---|---|---|---|
| 3,679,999 | 7/1972 | Chernoch | 331/94.5 |
| 3,949,323 | 4/1976 | Bierlein et al. | 332/7.51 |
| 4,048,515 | 9/1977 | Liu | 307/88.3 |
| 4,231,838 | 11/1980 | Gier | 156/600 |
| 4,740,975 | 4/1988 | Abrahams et al. | 372/41 |
| 4,884,277 | 11/1989 | Anthon et al. | 372/22 |
| 4,907,235 | 3/1990 | Kuizenga | 372/21 |
| 5,038,352 | 8/1991 | Lenth et al. | 372/21 |
| 5,079,445 | 1/1992 | Guyer | 359/330 |
| 5,142,542 | 8/1992 | Dixon | 372/22 |
| 5,144,630 | 9/1992 | Lin | 372/22 |

OTHER PUBLICATIONS

Koechner, Solid-State Laser Engineering, 2nd Ed., Springer-Verlag, 1988, pp. 477-518, particularly pp. 514-518.
Kleinman, et al., Second Harmonic Generation of Light by Focused Laser Beams, Physical Review, vol. 145, No. 1, May 1966, pp. 338-346.
Boyd, et al., Second-Harmonic Generation of Light with Double Refraction, Physical Review, vol. 137, No. 4A, Feb. 1965, pp. A1305-A1320.
Chaoen, et al., A Stable 33W Green Laser Obtained by Intracavity Frequency-Doubling Using a KTP Crystal, Chinese Physics-Lasers, vol. 15, No. 10, Oct. 1988, pp. 726-729.
Eimerl, High Average Power Harmonic Generation, IEEE Journal of Quantum Electronics, vol. QE-23, No. 5, May, 1987, pp. 575-592.
Koechner, Solid-State Laser Engineering, 2d Ed, Springer-Verlag, 1988, pp. 391-397.
Boczar, Second Harmonic Generation of Slab Lasers, SPIE, vol. 736, 1987, pp. 60-64.
Rapoport, et al., Nd:Yag Slab Oscillators, Amplifiers and Optical Phase Conjugation, SPIE, vol. 736, pp. 65-71, 1987.
Handbook of Laser Science and Technology, Section 2: "Solid State Lasers", p. 55 et seq. (no date available).
Laser Focus Worlds, "World News: Lasers", Aug. 1990, pp. 27-28 and 30.

Primary Examiner—Frank Gonzalez
Attorney, Agent, or Firm—Fliesler, Dubb, Meyer & Lovejoy

[57] ABSTRACT

A crystalline slab laser system with an intracavity non-linear optic comprising one of a group of KTP and its isomorphs provides high power frequency summing or doubling. The optical path of the laser travels through the slab shaped gain media in a zigzag pattern.

19 Claims, 2 Drawing Sheets

CRYSTALLINE SLAB LASER WITH INTRACAVITY NON-LINEAR OPTIC

FIELD OF THE INVENTION

The present invention relates to laser systems, including intracavity non-linear optics, such as used for frequency doubling; and more particularly to high power solid state laser systems with intracavity non-linear optics.

BACKGROUND OF THE INVENTION

In a laser system, the harmonics of the fundamental electro-magnetic radiation of the laser source may be generated using a non-linear optic, such as non-linear optical crystals, like KDP, KD*P, KTP, LBO, BBO, and others. For a discussion of harmonic generation and solid state laser systems, see Koechner, "Solid-State Laser Engineering," 2d. Ed., Springer-Verlag, 1988, pp. 477–518, and particularly, pp. 514–518. See, also, Kleinman, et al., "Second Harmonic Generation of Light By Focused Laser Beams," Physical Review, Vol. 145, No. 1, May, 1966, pp. 338–346; and Boyd, et al., "Second-Harmonic Generation of Light with Double Refraction," Physical Review, Vol. 137, No. 4A, February, 1965, pp. A1305–A1320.

To obtain the laser sum frequencies or harmonics, the non-linear optic may either be placed within the resonant cavity or external to it. These two techniques are referred to, respectively, as intracavity harmonic generation and extracavity harmonic generation. A significant design choice exists between intracavity and extracavity harmonic generation due to the greater power efficiency provided by an intracavity design. See, for example, Chaoen, et al., "A stable 33W green laser obtained by intracavity frequency-doubling using a KTP crystal." *Chinese Physics-Lasers*, Vol. 15, No. 10, October, 1988, pp. 726–729. However, an intracavity design, in contrast to an extracavity design, presents substantial difficulties.

For example, an intracavity design exposes the non-linear optic to much higher radiation intensities than an extracavity design. In high power operation where the power density within the non-linear optic is increased, this can result in damage to the non-linear optic.

Intracavity designs also provide further difficulties in attempting to operate at high power and in multimode. For instance, as noted above, damage to the non-linear optic can result if the power density within the non-linear optic becomes too great. Since power density is in at least one aspect a function of spot size, controlling the spot size of the beam at the point of interaction with the non-linear crystal is critical. Thus, the design of the resonator for intracavity design must involve consideration of the spot size at the non-linear optic, in addition to analysis of resonator stability. In conventional lasers using Nd:YAG rods for the gain media, a thermal lensing effect occurs in the rod of Nd:YAG as pump power increases which can cause a decrease in the spot size in the non-linear optic. This results in an increase in the power density within the non-linear optic due to the additive effect on intensity of stronger thermal lensing (the YAG rod acts as a positive biconvex lens) and intracavity power increase. Therefore, limiting the effects of thermal lensing to protect the integrity of the non-linear optic is an important design problem.

One technique for controlling the spot size at the optic interface in such Nd:YAG rod systems is an optical relay described in detail in U.S. Pat. No. 4,907,235, invented by Kuizenga, issued Mar. 6, 1990, which is incorporated by reference as if fully set forth herein. Though the relay technique disclosed by Kuizenga is useful, it places limitations on the design of the laser system.

Another difficulty encountered in high power operation using an Nd:YAG rod as a gain media is the deterioration in the quality of the beam, especially where the beam includes multiple transverse modes. Deterioration of the beam is a significant problem in that it lowers the efficiency of the non-linear interaction, and therefore limits the amount of sum frequency or second harmonic power the laser system can generate. If the beam is multimode, the efficiency of the laser system drops even further. For a discussion of beam deterioration at high power and its impact on design limitations in laser systems, see Eimerl, "High Average Power Harmonic Generation," IEEE Journal of Quantum Electronics, Vol. QE-23, No. 5, May, 1987, pp. 575–592.

Laser systems for high power applications have been designed using a slab shaped gain medium, in which zigzag optical path is used. These slab laser systems are particularly useful in high power Nd:YAG embodiments, in which the zigzag optical path greatly minimizes the thermal focusing problem. However, such systems are highly multimode and do not provide a high quality output beam. For a discussion of the zigzag optical path in a slab laser system, see Koechner, "Solid State Laser Engineering," 2nd Ed., Springer-Verlag, 1988, pp. 391–397.

A laser system using a slab shaped gain media has been used for second harmonic generation with the non-linear crystal outside the resonant cavity is set forth in Boczar, "Second Harmonic Generation of Slab Lasers," SPIE, Vol. 736, 1987, pp. 60–64, with reference to Rapoport, et al., "Nd:YAG Slab Oscillators, Amplifiers, and Optical Phase Conjugation," SPIE, Vol. 736, pp. 65–71. However, the extracavity non-linear optic, as noted previously, does not present the design difficulties associated with intracavity designs. Further, the Boczar reference operates in single axial mode, which again does not present the problems associated with multimode operations, as disclosed by the present invention.

It is desirable therefore to provide intracavity frequency doubled or some frequency systems producing high powers in the output wavelength, and particularly high power greater than sustained 35 watts, in generically viable forms.

SUMMARY OF THE INVENTION

The present invention discloses a laser system comprising a slab shaped gain media and an intracavity non-linear optic. In one aspect of the invention, the slab shaped gain media comprised of Nd:YAG mounted in a resonant cavity supporting a cavity mode is supplied with pump energy to provide optical gain at a wavelength $\lambda 1$. The non-linear optic generates light at a second wavelength $\lambda 2$ as a function of $\lambda 1$. An output beam at $\lambda 2$ is extracted from the cavity with an output coupler. The output power in the second wavelength $\lambda 2$ may exceed 35 W.

In a related aspect, the optical path travels a zigzag pattern through the slab shaped gain media. In a related aspect, the cavity mode is multimode.

In another aspect, a non-linear optic comprising one of a group of KTP and its isomorphs is mounted in the optical path. As the beam passes through, the non-linear optic generates harmonics of the radiation of the slab shaped gain material.

The use of a slab shaped gain media in an intracavity laser system to generate harmonics overcomes the problems associated with the use of a rod of Nd:YAG, especially in multimode, high power operation. In comparison to a rod of Nd:YAG, a properly designed laser using a slab of Nd:YAG does not exhibit the effects of strong thermal lensing which cause the spot size of the beam at the crystal interface to fluctuate. Further, because the beam of a slab shaped gain media does not deteriorate in high power or multimode operation to the extent it does using a rod of Nd:YAG, the high power handling capability of the laser system is greatly enhanced. As such, the present invention sets forth a high power, multimode intracavity-frequency doubled laser system.

Other aspects and advantages of the present invention will be seen upon review of the figures, the detailed description, and the claims which follow.

DESCRIPTION OF THE PREFERRED EMBODIMENTS

A detailed description of preferred embodiments of the present invention is provided with references to the figures. The FIGS. 1 and 2 show alternative resonant cavity designs including slab shaped gain media and intracavity non-linear optics for harmonic, or sum-of-frequency, generation responsive to the fundamental electro-magnetic radiation of the laser.

Figure 1:
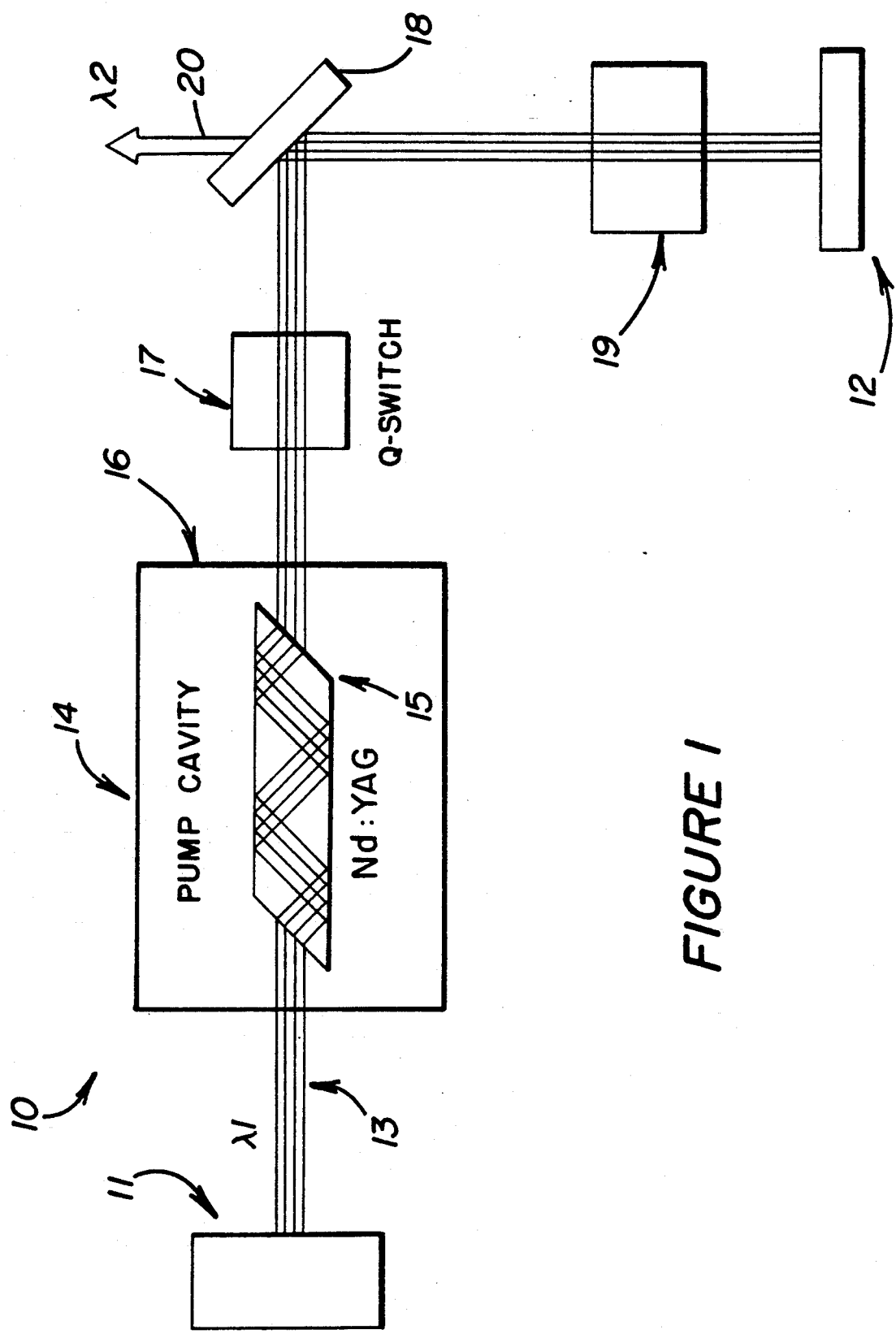
FIG. 1 is a diagram of a laser system according to the present invention.
Figure 2:
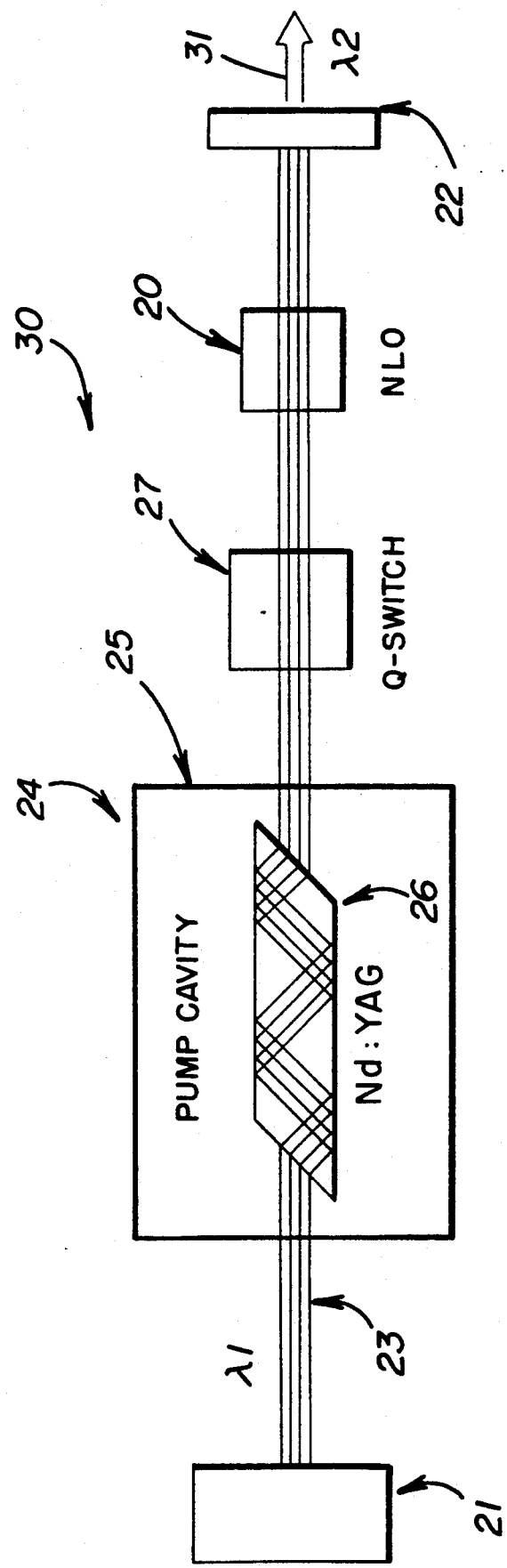
FIG. 2 is a diagram of an alternative embodiment of the laser system according to the present invention.

As illustrated in FIG. 1, the laser system, according to one embodiment of the present invention, includes an "L"-shaped resonant cavity referred to generally by the reference number 10. An optical path 13 within the resonant cavity is defined by first mirror 11 and a second mirror 12. Along the optical path 13 are mounted a slab-shaped gain medium, referred to generally by the reference number 14, which may have a square cross-section transverse to the plane of the drawing for providing gain at a wavelength $\lambda 1$. In the preferred system, the slab-shaped gain medium comprises Nd:YAG or Nd:YLF 15 mounted in a pump cavity 16, including an arc lamp or plural arc lamps having lamp input powers over 400 W. Other crystalline gain media materials may be used, such as Nd:GSGG or Chromium doped crystals. See, *Handbook of Laser Science and Technology.* Section 2: Solid State Lasers, p. 55 et seq. Also, the source of pump energy may take other forms, such as diode laser arrays with over 50 W input power.

The optical path 13 proceeds through the Nd:YAG slab 15 in a zigzag pattern as described in Koechner, cited above.

Adjacent the gain medium 14 is a Q-switch 17. Preferably, the Q-switch is an acousto-optic Q-switch. Output coupler 18 is mounted adjacent the Q-switch 17. The output coupler 18 is a dichroic mirror which is highly reflective at the cavity mode wavelength and transmissive at the desired output wavelength $\lambda 2$. At the output coupler 18, the optical path 13 is folded towards the second end mirror 12 which is reflective at both $\lambda 1$ and $\lambda 2$. Mounted between the output coupler 18 and the second end mirror 12 is a non-linear optical crystal 19. The output wavelength $\lambda 2$ is generated within the non-linear crystal 19 in response to the fundamental resonating mode at wavelength $\lambda 1$. The output coupler 18 transmits an output beam 20 at wavelength $\lambda 2$.

The preferred non-linear crystal 19 consists of KTP, or isomorphs of KTP. KTP and its isomorphs are described in detail in U.S. Pat. No. 3,949,323, to Bierlein, et al., and U.S. Pat. No. 4,231,838, to Gier. Such patents are incorporated by reference for a teaching of properties of KTP and its isomorphs. Other non-linear crystals such as LBO and BBO may be used as well.

As compared with a rod of Nd:YAG, the slab of Nd:YAG 15 does not exhibit thermal lensing. As such, a constant spot size at the interface between the beam and the non-linear optic 19 is maintained over wide ranging input powers, and the non-linear optic is less susceptible to damage at increased powers.

Surgically useful powers greater than 5 W, 8 W, or 10 W in the green are easily achieved. Greater than 2 W in the red for therapeutic uses, such as photodynamic therapy, are also easily achieved. Output powers greater than 35 W sustained at 532 nm may be achieved with the design of FIG. 1. The laser may be multiaxial mode (or have a wide linewidth) but it may be single or multitransverse mode, i.e., $TEM_{00}$ or $TEM_{11^*}$, $TEM_{22^*}$, $TEM_{23}$, etc.

FIG. 2 illustrates an alternative resonator design according to the present invention. In FIG. 2, the resonant cavity referred to generally as 30 has a straight line shape and is defined by mirror 21 and an output coupler 22. The output coupler 22 is highly reflective at the cavity mode $\lambda 1$ and somewhat transmissive at the output mode $\lambda 2$ producing an output beam. An optical path 23 is defined between the first mirror 21 and the output coupler 22. Mounted within the resonant cavity 20 in the optical path 13 is a gain medium referred to generally as 24. The gain medium consists of a pump cavity 25 coupled with an Nd:YAG slab 26. Also mounted in the optical path is a Q-switch 27. Also mounted in the optical path adjacent the output coupler is a non-linear optical crystal 28. Other cavity designs than those shown in FIGS. 1 and 2, such as systems with multiple folds, may be applied to high power crystalline slab systems.

The description of the preferred embodiments set forth an intracavity laser system design for generating harmonics of the fundamental frequency of the electro-magnetic radiation of the gain media. It does so at high power and in multiple axial modes.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A laser system for generating an output beam, comprising:
   a resonant cavity supporting a cavity mode at or near wavelength $\lambda 1$, defining an optical path;
   a gain medium including a slab shaped crystalline, solid state gain material, mounted in the optical path within the resonant cavity, providing optical gain at or near wavelength $\lambda 1$ in response to pump energy wherein the optical path proceeds in a zig-zag pattern through the slab shaped solid state gain material;
   means, coupled with the gain medium, for supplying pump energy to the gain material;
   means mounted in the optical path within the resonant cavity for converting light at or near the wavelength $\lambda 1$ to wavelength $\lambda 2$; and
   an output coupler, mounted in the optical path within the resonant cavity, extracting light at or near the wavelength $\lambda 2$ to provide an output beam.

2. The laser system of claim 1, wherein means for converting light comprises a non-linear optical material.

3. The laser system of claim 2, wherein the non-linear optical material comprises one of a group including KTP and its isomorphs.

4. The laser system of claim 1, wherein the resonant cavity includes:
   a first mirror and a second mirror both mounted in the optical path wherein both the first and second mirrors are reflective at or near wavelengths $\lambda 1$ and $\lambda 2$ and the output coupler is mounted in the optical path between the first and second mirrors defining a folded resonant cavity.

5. The laser system of claim 1, wherein the resonant cavity includes:
   a first mirror mounted in the optical path wherein the first mirror is reflective at or near both wavelength $\lambda 1$ and $\lambda 2$ so that a straight shaped resonant cavity is defined by the first mirror and the output coupler.

6. The laser system of claim 1, wherein the slab shaped solid state gain material consists essentially of a neodymium doped host, the host selected from a group including YAG and YLF.

7. The laser system of claim 1, wherein the cavity mode is multimode.

8. A laser system for generating an output beam having medically useful output power, comprising:
   a resonant cavity supporting a multimode cavity mode at or near wavelength $\lambda 1$, the resonant cavity defining an optical path;
   a non-linear optical material mounted in the optical path within the resonant cavity to convert light at or near wavelength $\lambda 1$ to light at or near wavelength $\lambda 2$;
   a gain medium comprising a slab shaped crystalline solid state gain material, mounted in the optical path within the resonant cavity, providing optical gain at or near wavelength $\lambda 1$ in response to pump energy, the optical path in the solid state gain material travelling along a zigzag pattern;
   means, coupled with a gain medium, for supplying pump energy to the gain medium; and
   an output coupler, mounted in the optical path within the resonant cavity, extracting light at or near the wavelength $\lambda 2$ to provide an output beam.

9. The laser system of claim 8, wherein the non-linear optical material comprises one of the group including KTP and its isomorphs.

10. The laser system of claim 8, wherein the resonant cavity includes:
    a first mirror and a second mirror both mounted in the optical path wherein both the first and second mirrors are reflective at or near wavelengths $\lambda 1$ and $\lambda 2$ and the output coupler is mounted in the optical path between the first and second mirrors defining a folded resonant cavity.

11. The laser system of claim 8, wherein the resonant cavity includes:
    a first mirror mounted in the optical path wherein the first mirror is reflective at or near both wavelength $\lambda 1$ and $\lambda 2$ so that a straight shaped resonant cavity is defined by the first mirror and the output coupler.

12. The laser system of claim 8, wherein the slab shaped solid state gain material consists essentially of a neodymium doped host, the host selected from a group including YAG and YLF.

13. A laser system for generating an output beam, comprising:
    a resonant cavity tuned for a cavity mode at or near wavelength $\lambda 1$, the resonant cavity defining an optical path wherein the cavity mode includes multiple axial modes;
    a gain medium comprising a slab shaped Nd:YAG gain material, mounted in the optical path within the resonant cavity, providing optical gain at or near wavelength $\lambda 1$ in response to pump energy, the optical path in the solid state gain medium travelling along a zigzag pattern;
    means, coupled with the gain medium, for supplying pump energy to the gain medium;
    a non-linear optical material, comprising one of the group including KTP and its isomorphs, mounted in the optical path within the resonant cavity causing conversion of light at or near wavelength $\lambda 1$ to light at or near wavelength $\lambda 2$; and
    an output coupler, mounted in the optical path within the resonant cavity, extracting light at or near wavelength $\lambda 2$ to provide an output beam having output power greater than 2 watts.

14. The laser system of claim 13, wherein the resonant cavity includes:
    a first mirror and a second mirror both mounted in the optical path wherein both the first and second mirrors are reflective at or near wavelengths $\lambda 1$ and $\lambda 2$ and the output coupler is mounted in the optical path between the first and second mirrors defining a folded resonant cavity.

15. The laser system of claim 13, wherein the resonant cavity includes:
    a first mirror mounted in the optical path wherein the first mirror is reflective at or near both wavelength $\lambda 1$ and $\lambda 2$ so that a straight shaped resonant cavity is defined by the first mirror and the output coupler.

16. A laser system of claim 9, wherein the slab shaped solid state gain material consists essentially of a neodymium doped host, the host selected from a group including YAG and YLF.

17. The laser system of claim 13, wherein the output power is greater than 5 Watts.

18. The laser system of claim 13, wherein the output power is greater than 8 Watts.

19. The laser system of claim 13, wherein the output power is greater than 10 Watts.

* * * * *